US008784925B2

(12) United States Patent
Shigeno et al.

(10) Patent No.: US 8,784,925 B2
(45) Date of Patent: Jul. 22, 2014

(54) REFINED ROASTED COFFEE BEANS, COFFEE COMPOSITION, AND METHOD OF MAKING COMPOSITION AND SOLUBLE PRODUCT

(75) Inventors: Chitoshi Shigeno, Sumida-ku (JP); Yasushi Shioya, Sumida-ku (JP); Tatsuya Kusaura, Sumida-ku (JP); Yoshikazu Ogura, Sumida-ku (JP); Yoshinobu Hayakawa, Sumida-ku (JP)

(73) Assignee: Kao Corporation, Tokyo (JP)

( * ) Notice: Subject to any disclaimer, the term of this patent is extended or adjusted under 35 U.S.C. 154(b) by 0 days.

(21) Appl. No.: 13/603,946

(22) Filed: Sep. 5, 2012

(65) Prior Publication Data
US 2012/0328762 A1 Dec. 27, 2012

Related U.S. Application Data

(63) Continuation of application No. 12/521,633, filed as application No. PCT/JP2007/075400 on Dec. 27, 2007, now Pat. No. 8,318,228.

(30) Foreign Application Priority Data

Dec. 27, 2006 (JP) ................................. 2006-350800

(51) Int. Cl.
*A23F 5/36* (2006.01)
*A23F 5/02* (2006.01)
(52) U.S. Cl.
USPC ............. 426/594; 426/87; 426/433; 426/595; 426/431; 426/631; 426/432; 426/590; 426/593; 426/629; 426/430
(58) Field of Classification Search
USPC ........... 426/87, 433, 594, 595, 431, 631, 432, 426/435, 590, 593, 629, 430
See application file for complete search history.

(56) References Cited

U.S. PATENT DOCUMENTS

| | | | |
|---|---|---|---|
| 3,796,805 A | 3/1974 | Lemonnier et al. | |
| 4,234,613 A | 11/1980 | Lewis | |
| 4,976,983 A | 12/1990 | Hirsh et al. | |
| 5,014,611 A | 5/1991 | Illy et al. | |
| 5,888,549 A | 3/1999 | Buchholz et al. | |
| 7,713,566 B2 | 5/2010 | Zapp et al. | |
| 8,178,148 B2* | 5/2012 | Fujii et al. | 426/422 |
| 8,263,149 B2* | 9/2012 | Hayakawa et al. | 426/130 |
| 8,318,228 B2* | 11/2012 | Shigeno et al. | 426/432 |
| 2005/0215632 A1 | 9/2005 | Suzuki et al. | |
| 2007/0160726 A1 | 7/2007 | Fujii et al. | |
| 2007/0248727 A1 | 10/2007 | Konishi et al. | |
| 2008/0118604 A1 | 5/2008 | Mickowski et al. | |
| 2010/0104702 A1 | 4/2010 | Hayakawa et al. | |
| 2010/0285182 A1 | 11/2010 | Shioya et al. | |
| 2013/0243930 A1* | 9/2013 | Kusaura | 426/595 |

FOREIGN PATENT DOCUMENTS

| | | |
|---|---|---|
| CA | 1331846 | 9/1994 |
| CN | 1071057 A | 4/1993 |
| EP | 0 534 024 A2 | 3/1993 |
| EP | 1 716 757 A1 | 11/2006 |
| EP | 1 716 758 A1 | 11/2006 |
| EP | 1 911 354 A1 | 4/2008 |
| EP | 1 925 208 A1 | 5/2008 |
| JP | 60 62945 | 4/1985 |
| JP | 63 502319 | 9/1988 |
| JP | 1-112949 | 5/1989 |
| JP | 1 168238 | 7/1989 |
| JP | 3-65140 | 3/1991 |
| JP | 3 127950 | 5/1991 |
| JP | 4 88947 | 3/1992 |
| JP | 5 76285 | 3/1993 |
| JP | 7-313063 | 12/1995 |
| JP | 11 266842 | 10/1999 |
| JP | 2002-363075 | 12/2002 |
| JP | 2003 81824 | 3/2003 |
| JP | 2005-263632 | 9/2005 |
| JP | 2006 87306 | 4/2006 |
| JP | 2006-149235 | 6/2006 |
| JP | 2006-149236 | 6/2006 |
| JP | 2006 191925 | 7/2006 |
| JP | 2006 204192 | 8/2006 |
| JP | 2006-204192 | 8/2006 |
| JP | 2006-306799 | 11/2006 |
| WO | 2005 072533 | 8/2005 |
| WO | 2006 033326 | 3/2006 |
| WO | WO 2007/013615 A1 | 2/2007 |
| WO | WO 2007/013617 A1 | 2/2007 |

OTHER PUBLICATIONS

Office Action issued Oct. 2, 2012 in Japanese Application No. 2011-264231 (With English Translation).

(Continued)

*Primary Examiner* — Anthony Weier
(74) *Attorney, Agent, or Firm* — Oblon, Spivak, McClelland, Maier & Neustadt, L.L.P.

(57) ABSTRACT

The present invention provides refined roasted coffee beans having a Hunter L value of 10 to 30 and a hydroxyhydroquinone content of not higher than 30 mg/kg by contacting an aqueous solvent with raw material roasted coffee beans. The invention also provides a process for producing refined roasted coffee beans, which includes contacting raw material roasted coffee beans having a Hunter L value of 12 to 35, with coffee bean-derived extract-containing water selected from water containing an extract derived from roasted coffee beans having a Hunter L value of 40 or more and water containing an extract derived from raw coffee beans.

21 Claims, No Drawings

(56) References Cited

OTHER PUBLICATIONS

Office Action issued Aug. 31, 2012 in Chinese Patent Application No. 200780048532.0 with English language translation.
Extended Search Report issued Feb. 16, 2011 in Europe Application No. 07860595.3.
Office Action issued Dec. 1, 2011, in European Patent Application No. 07860595.3.
Office Action issued Oct. 4, 2011, in Japanese Patent Application No. 2007-333932 with English translation.
Office Action issued Nov. 22, 2011, in Chinese Patent Application No. 200780048532.0 with English translation.
Gonzalez-Rios et al, Impact of "Ecological" Post-Harvest Processing on coffee aroma: II, Roasted Coffee, 2007, http:/www.aseanfood.info/Articles/11018573.pdf.
Yamaguchi, T. et al., "Hydroxyhydroquinone—Free Coffee: A Double-Blind, Randomized Controlled Dose-Response Study of Blood Pressure", Nutrition, Metabolism & Cardiovascular Diseases, pp. 1-7 (Oct. 22, 2007).
Takaya, M. et al., "Influence of Roasting Time and Extraction Conditions on Quantity of Chlorogenic Acid in Coffee", Nippon Shokuseikatsu Gakkaishi, vol. 16, No. 3, pp. 224-229 (2005).
Tressl, R. et al., "Diphenole Und Caramelkomponenten in Roestkaffees Verschiedener Sorten. II.", Z. Lebensm. Unters. Forsch., vol. 167, No. 2, pp. 111-114 (1978).
Nurminen, M.-L. et al., "Coffee, Caffeine, and Blood Pressure: A Critical Review", European Journal of Clinical Nutrition, vol. 53, pp. 831-839 (1999).
U.S. Appl. No. 13/614,434, filed Sep. 13, 2012, Kusaura.
U.S. Appl. No. 14/020,083, filed Sep. 6, 2013, Kusaura.

* cited by examiner

REFINED ROASTED COFFEE BEANS, COFFEE COMPOSITION, AND METHOD OF MAKING COMPOSITION AND SOLUBLE PRODUCT

FIELD OF THE INVENTION

The present invention relates to refined roasted coffee beans and a process for producing the same.

BACKGROUND OF THE INVENTION

Chlorogenic acids, caffeic acids, ferulic acids etc., which are contained in foods such as coffee, have been reported to show an excellent hypotensive action (JP-A 2006-204192, JP-B 4-29326, JP-A 3-127950). However, coffee beverages containing merely chlorogenic acids in large quantity are also reported to have no plainly recognizable hypotensive action and tend to increase the blood pressure to the contrary (Eur. J. Clin. Nutr., 53 (11), 831 (1999)). Hydrogen peroxide derived from hydroxyhydroquinone contained in coffee beverages has been found to inhibit the hypotensive action of chlorogenic acids (JP-A 2006-204192). On one hand, coffee contains hydrogen peroxide which naturally emerges upon roasting (Eur. J. Clin. Nutr., 53(11), 831 (1999)), and a technology of removing hydrogen peroxide from coffee by adding catalase, peroxidase or antioxidant (JP-A 3-127950, JP-A 11-266842, JP-A 2003-81824) has been reported.

Coffee is a highly palatable beverage, and its influences on the health of human body have attracted attention in recent years. The present inventors have paid attention to a hypotensive action as one influence and reported that hydroxyhydroquinone contained in a coffee beverage composition is reduced such that the weight ratio of hydroxyhydroquinone/chlorogenic acids in the coffee beverage composition is reduced to 10/10000 or less at which the hypotensive action of coffee was recognized, and as a specific method, a method of treating a coffee extract with activated carbon has been adopted (WO-A 05/72533).

As methods of treating coffee beans, there are proposed methods such as a decaffeinating method of contacting raw coffee beans with an organic solvent, water or a supercritical fluid, a method of wash treatment, with water, of matter that has adhered to the surfaces of raw coffee beans, and a method of removing a stimulating substance by high-pressure steaming of raw coffee beans.

SUMMARY OF THE INVENTION

The present invention (I) provides refined roasted coffee beans having a Hunter L value of 10 to 30 and a hydroxyhydroquinone content of not higher than 30 mg/kg.

The present invention also provides a process for producing refined roasted coffee beans having a hydroxyhydroquinone content of not higher than 30 mg/kg, which includes contacting an aqueous solvent with raw material roasted coffee beans.

The present invention (II) is based on the fining described above, and provides a process for producing refined roasted coffee beans, which includes contacting refined roasted coffee beans having a Hunter L value of 12 to 35, with water containing an extract derived from roasted coffee beans having a Hunter L value of 40 or more or water containing an extract derived from raw coffee beans (hereinafter referred to as coffee bean-derived extract-containing water).

DETAILED DESCRIPTION OF THE INVENTION

Any of the conventional methods of treating coffee beans relate to methods of treating raw coffee beans, and methods for removing hydroxyhydroquinone from roasted coffee beans have not been reported as far as known to the applicant.

The invention (I) provides refined roasted coffee beans with a reduced content of hydroxyhydroquinone.

To enable production of coffee extracts having an excellent hypotensive action, the present inventors extensively studied a method of removing hydroxyhydroquinone as a hydrogen peroxide source from raw material roasted coffee beans, and as a result, they found that refined roasted coffee beans having a hydroxyhydroquinone content reduced to not higher than 30 mg/kg can be produced.

The invention (II) provides a process for producing refined roasted coffee beans containing chlorogenic acids at high concentration, having a low mass ratio of hydroxyhydroquinone to chlorogenic acids, and being excellent in flavor.

The present inventors examined a method capable of removing hydroxyhydroquinone at the stage of coffee beans, and as a result, they found that the treatment of raw material roasted coffee beans with an aqueous solution containing chlorogenic acids but scarcely containing hydroxyhydroquinone is effective in removing hydroxyhydroquinone effectively while allowing chlorogenic acids to remain in coffee beans that were roasted to such a degree as to attain fragrance.

According to the invention (I) directed to the refined roasted coffee beans having a hydroxyhydroquinone content of not higher than 30 mg/kg and to the process for producing the same, it is possible to produce coffee extracts having an excellent hypotensive action.

According to the invention (II), it is possible to obtain refined roasted coffee beans maintaining fragrance, having a high content of chlorogenic acids, and having effectively reduced hydroxyhydroquinone. Further, there is provided a process for producing refined roasted coffee beans having a high concentration of chlorogenic acids, having a low mass ratio of hydroxyhydroquinone to chlorogenic acids, and being excellent in flavor.

First, the refined roasted coffee beans obtained in the present invention will be described.

The kinds of coffee beans in the present invention include, but are not limited to, Brazil, Columbia, Tanzania, Mocha, Kilimanjaro, Mandheling, and Blue Mountain. The species of coffee beans include an *Arabica* species, and a *Robusta* species. As coffee beans, either one kind or a blend of two or more kinds may be used.

Hereinafter, the invention (I) will be described in detail.

The Hunter L value as determined with a color-difference meter from the degree of roasting of the product of the present invention is 10 to 30. From the viewpoint of an excellent flavor of an extract from the refined roasted coffee beans, the Hunter L value is preferably 10 to 25, more preferably 15 to 25. When the Hunter L value is 10 or more, the refined roasted coffee beans have a less burning smell, and when the L value is 30 or less, the beans become excellent in flavor. Two or more kinds of refined roasted coffee beans different in the degree of roasting with Hunter L values of 10 to 60 may be mixed and regulated to have a Hunter L value of 10 to 30.

A method of measuring the degree of roasting is carried out as follows. 50% of roasted coffee beans are ground to a grain size of 0.8 to 1.2 mm such that the amount of beans having a grain size of 0.5 mm or less and the amount of beans having a grain size of 2 mm or more are regulated to be 5% or less respectively, and chaff is removed as necessary. The ground beans are introduced into a cell, sufficiently tapped and then measured with a spectroscopic colorimeter. As the spectroscopic colorimeter, SE-2000 manufactured by Nippon Denshoku Industries Co., Ltd. or the like can be used.

The amount of chlorogenic acids in the refined roasted coffee beans is preferably 0.1 to 6% by mass (hereinafter referred to merely as %), more preferably 0.1 to 5%. The amount of chlorogenic acids in the refined roasted coffee beans is more preferably 0.1 to 4.5%, even more preferably 0.2 to 4.2% and even more preferably 0.2 to 4%.

The content of hydroxyhydroquinone in the refined roasted coffee beans is not higher than 30 mg/kg. The content of hydroxyhydroquinone in the refined roasted coffee beans is preferably 0.01 to 20 mg/kg, more preferably 0.01 to 10 mg/kg, even more preferably 0.01 to 5 mg/kg, and even more preferably 0.01 to 1 mg/kg.

The content of hydroxyhydroquinone relative to the amount of chlorogenic acids in the refined roasted coffee beans is preferably lower than 0.1%, more preferably 0.0001 to 0.06%, even more preferably 0.0001 to 0.03%. When the content of hydroxyhydroquinone relative to the amount of chlorogenic acids in the refined roasted coffee beans is lower than 0.1%, the generation of hydrogen peroxide in the body is inhibited and simultaneously the physiological effects of chlorogenic acids reduced by hydroxyhydroquinone, for example, hypertension-alleviating effects, can be easily exhibited.

The content of chlorogenic acids relative to the content of soluble solids in the refined roasted coffee beans is preferably 0.5 to 30%. The content of chlorogenic acids relative to the content of soluble solids in the refined roasted coffee beans is preferably 0.5 to 25%, more preferably 0.5 to 17%, even more preferably 1 to 15%, and even more preferably 1 to 13%. When the content of chlorogenic acids relative to the content of soluble solids in the refined roasted coffee beans is in this range, the physiological effects of chlorogenic acids in coffee beverages can be easily exhibited and simultaneously an excellent coffee flavor can be easily obtained.

As the chlorogenic acids, three chlorogenic acids, that is, monocaffeoylquinic acid, feruloylquinic acid and dicaffeoylquinic acid are known, and the content of chlorogenic acids herein is indicated as the total amount of these acids. Specifically, monocaffeoylquinic acid includes one or more members selected from 3-caffeoylquinic acid, 4-caffeoylquinic acid, and 5-caffeoylquinic acid. Feruloylquinic acid includes one or more members selected from 3-feruloylquinic acid, 4-feruloylquinic acid, and 3-feruloylquinic acid. Dicaffeoylquinic acid includes one or more members selected from 3,4-dicaffeoylquinic acids, 3,5-dicaffeoylquinic acids, and 4,5-dicaffeoylquinic acids.

The composition of the refined roasted coffee beans in the present invention is determined from the composition of a liquid extracted from the refined roasted coffee beans. The extraction conditions used are those described in the Examples.

The content of the chlorogenic acids is measured by high-performance liquid chromatography (HPLC) with a UV-VIS detector. The measurement conditions used are those described in the Examples.

The content of the hydroxyhydroquinone is measured by HPLC with an electrochemical detector. The measurement conditions used are those described in the Examples.

The content of the soluble solids is measured at 20° C. and expressed in Brix (refractometer index for sugar). As a sugar refractometer, ATAGO RX-5000α-Bev (manufactured by ATAGO CO., LTD.) or the like can be used.

The amounts of chlorogenic acids, hydroxy quinone and soluble solids as determined by the measurement described above are calculated respectively as the contents in the coffee beans by the following equations:

Amount (% relative to coffee beans) of chlorogenic acids in the refined roasted coffee beans=(concentration (mg/kg) of chlorogenic acids in the extraction solvent×mass (kg) of the extraction solvent/mass (kg) of the refined roasted coffee beans)/10000(%)    (1)

Amount (mg/kg) of hydroxyhydroquinone in the refined roasted coffee beans=(concentration (mg/kg) of hydroxyhydroquinone in the extraction solvent×mass (kg) of the extraction solvent/mass (kg) of the refined roasted coffee beans)    (2)

Amount (% relative to coffee beans) of soluble solids in the refined roasted coffee beans=content (%) of soluble solids in the extraction solvent×mass (kg) of the extraction solvent/mass (kg) of the refined roasted coffee beans    (3)

Now, the process for producing refined roasted coffee beans will be described.

First, coffee beans are roasted to yield raw material roasted coffee beans.

The method of roasting coffee beans is not particularly limited, but can be carried out at 100 to 600° C., and the roasting temperature is preferably 100 to 300° C., more preferably 150 to 250° C. The heating system in the preferable roasting method includes a direct firing system, a hot air system, a semi-hot air system, a charcoal firing system, a far-infrared radiation system, a microwave system and a superheated steam system, and the apparatus type includes a horizontal drum type, a vertical drum type, a vertically rotating bowl type, a fluidized bed type and a pressurization type, and from the viewpoint of recovering soluble solids in a higher content during extraction, a horizontal drum open type, a horizontal drum hermetic type or a vertically rotating bowl type is preferable and the vertically rotating bowl type is particularly preferable. From the viewpoint of flavor, the beans are cooled to preferably 0 to 100° C., more preferably 10 to 60° C., within 30 minutes after roasting.

The raw material roasted coffee beans are those having a Hunter L value of preferably 12 to 35, more preferably 14 to 32, even more preferably 15 to 30 and even more preferably 15 to 25 as determined with a colorimeter. The raw material roasted coffee beans having these Hunter L values can be preferably used to yield refined roasted coffee beans having an excellent flavor and containing a suitable amount of chlorogenic acids. Two or more kinds of coffee beans different in the degree of roasting with Hunter L values of 10 to 60 may be mixed and regulated to have a Hunter L value of 12 to 35.

As the degrees of roasting of raw material roasted coffee beans, there are light, cinnamon, medium, high, city, full-city, French, and Italian, among which light, cinnamon, medium, high, and city are preferable because the coffee beans with these degrees contain a large amount of chlorogenic acids and provide easily drunk beverages.

According to the method of the present invention, raw material roasted coffee beans are contacted with an aqueous solvent, thereby extracting and removing hydroxyhydroquinone from the raw material roasted coffee beans.

The aqueous solvent includes water, a water-soluble organic solvent, water-soluble organic solvent-containing water, water-soluble organic matter-containing water, coffee bean-derived extract-containing water, and chlorogenic acid-containing water.

From the viewpoint of efficiently removing hydroxyhydroquinone, the aqueous solvent is preferably water-soluble organic solvent-containing water, chlorogenic acid-containing water or coffee bean-derived extract-containing water, more preferably chlorogenic acid-containing water or coffee bean-derived extract-containing water, even more preferably coffee bean-derived extract-containing water.

The water-soluble organic solvent includes ethanol, methyl ethyl ketone, methanol, and acetone. From the viewpoint of efficiently removing hydroxyhydroquinone, ethanol is preferable.

The water-soluble organic matter is preferably an organic matter which is dissolved in an amount of 25 g or more in 100 g of water at 20° C. Specifically, the water-soluble organic matter can be exemplified by sugars, polyhydric alcohols, water-soluble polymers, etc. These water-soluble organic matters maybe used alone or as a mixture of two or more thereof. The sugars include glucose, galactose, fructose, mannose, mannitol, saccharose, maltose, lactose, and oligosaccharides. The polyhydric alcohols include glycerin, sorbitol, ethylene glycol, polyethylene glycol, propylene glycol, and polypropylene glycol. The water-soluble polymers include sodium polyacrylate, polyethyleneimine, polyvinyl alcohol, polyethylene oxide, and polyvinyl pyrrolidone.

Preferable among these water-soluble organic matters are polyhydric alcohols, among which glycerin or sorbitol is particularly preferable.

The water-soluble organic solvent and/or the water-soluble organic matter can be used at a concentration of 1 to 95%. From the viewpoint of efficiently removing hydroxyhydroquinone, the concentration of the water-soluble organic solvent and/or the water-soluble organic matter is preferably 10 to 80%, more preferably 30 to 70%, even more preferably 40 to 60%.

The coffee bean-derived extract includes an extract derived from raw coffee beans, and an extract derived from roasted coffee beans having a Hunter L value of 10 to 60.

From the viewpoint of coffee flavor, the coffee bean-derived extract is preferably an extract derived from roasted coffee beans having a Hunter L value of 10 to 40, more preferably an extract derived from roasted coffee beans having a Hunter L value of 10 or more and less than 40, even more preferably an extract derived from roasted coffee beans having a Hunter L value of 10 to 35, even more preferably an extract derived from roasted coffee beans having a Hunter L value of 10 to 30, and even more preferably an extract which is derived from roasted coffee beans having a Hunter L value of 10 to 30 and which has been treated to remove hydroxyhydroquinone therefrom.

As chlorogenic acids, it is possible to employ not only the coffee bean-derived extracts but also extracts derived from fruits such as prune, cherry and apple, extracts derived from vegetables such as eggplant, potato and carrot, and synthetic chlorogenic acid products.

The concentration of chlorogenic acids in the chlorogenic acid-containing water is preferably 0.01 to 10%, from the viewpoint of effectively preventing the elution of chlorogenic acids from roasted beans and simultaneously effectively eluting hydroxyhydroquinone. The concentration of chlorogenic acids in the chlorogenic acid-containing water is more preferably 0.1 to 7%, even more preferably 0.5 to 5%.

The content of hydroxyhydroquinone in the aqueous solvent is preferably not higher than 6 mg/kg, more preferably not higher than 3 mg/kg, even more preferably not higher than 1 mg/kg, and even more preferably not higher than 5 mg/kg.

The mass ratio of hydroxyhydroquinone to chlorogenic acids in the aqueous solvent is preferably 1% or less, more preferably 0.0001 to 0.5%, even more preferably 0.0001 to 0.1%, and even more preferably 0.0001 to 0.06%.

The method of contacting raw material roasted coffee beans with an aqueous solvent includes a stirring batch treatment method wherein the raw material roasted coffee beans are treated by mixing them with the aqueous solvent and a column treatment method wherein the raw material roasted coffee beans are packed in a column and the aqueous solvent is passed through the column. From the viewpoint of extraction efficiency, the column treatment method is preferable. In the stirring batch treatment method, the raw material roasted coffee beans are stirred preferably in a floating state in the aqueous solvent.

The column treatment method can make use, for example a column having a mesh structure in a liquid inlet and outlet respectively.

The raw material roasted coffee beans used may be either a ground or non-ground product. From the viewpoint of allowing flavors to remain in the roasted coffee beans, the ground product of the raw material roasted coffee beans has an average grain size of usually preferably 0.1 mm or more, more preferably 0.5 mm or more, even more preferably 1 mm or more, even more preferably 3 mm or more and even more preferably 5 mm or more, and non-ground roasted coffee beans are very preferable.

The mass of the aqueous solvent relative to 1 part by mass of the raw material roasted coffee beans is preferably 0.1 to 1000 parts by mass (hereinafter referred to merely as parts). From the viewpoint of efficiently removing hydroxyhydroquinone from the raw material roasted coffee beans, the aqueous solvent is preferably 0.1 to 100 parts, more preferably 1 to 50 parts, even more preferably 1 to 20 parts.

The temperature of the aqueous solvent may be such that the solvent is in a liquid state. From the viewpoint of allowing flavors and chlorogenic acids to remain in the roasted beans and simultaneously removing hydroxyhydroquinone therefrom, the temperature of the aqueous solvent is preferably 5 to 100° C., more preferably 5 to 60° C., even more preferably 5 to 30° C.

Contacting of the roasted coffee beans with the aqueous solvent can be conducted for 1 second to 100 hours. In the stirring batch treatment method, the contact time is preferably 1 to 50 hours. In the column passage method, the retention time of the aqueous solvent in the column is 1 minute to 10 hours, preferably 5 minutes to 1 hour.

The pH of the aqueous solvent is preferably 2 to 10, and more preferably 3 to 7.

Contacting of the raw material roasted coffee beans with the aqueous solvent preferably includes a step of contacting the aqueous solvent with a porous adsorbent. By contacting the aqueous solvent with a porous adsorbent, hydroxyhydroquinone which has transferred from raw material roasted coffee beans to the aqueous solvent can be removed by absorption into the porous adsorbent, and the hydroxyhydroquinone can thereby be efficiently removed from the raw material roasted coffee beans.

The relationship between contacting of the raw material roasted coffee beans with the aqueous solvent and contacting of the aqueous solvent with the porous adsorbent includes, for example, the following relationships: that is, (i) a step of previously contacting the aqueous solvent with the porous adsorbent, and then contacting the aqueous solvent which has been contacted with the porous adsorbent, with the raw material roasted coffee beans; (ii) a step of allowing the raw material roasted coffee beans, the aqueous solvent and the porous adsorbent to be simultaneously coexistent, thereby adsorbing, onto the porous adsorbent, hydroxyhydroquinone extracted from the raw material roasted coffee beans; and (iii) a step of contacting the raw material roasted coffee beans with the aqueous solvent, then contacting the aqueous solvent with the porous adsorbent, and again contacting, with the raw material roasted coffee beans, the aqueous solvent obtained by contacting with the porous adsorbent.

In any of the methods, contacting of the aqueous solvent with the porous adsorbent may be carried out by a method of dispersing the porous adsorbent in the aqueous solvent and then separating the porous adsorbent (stirring batch method) or by a method of passing the aqueous solvent through a column or the like charged with the porous adsorbent (column passage method). The method (ii) may be carried out by a method wherein a tank in which the aqueous solvent is contacted with the porous adsorbent, and a tank or column in which the aqueous solvent is brought into contact with the porous adsorbent, are separately prepared and then connected to each other, thereby circulating the aqueous solvent.

The method of contacting the aqueous solvent with the porous adsorbent includes a stirring batch method wherein the porous adsorbent, together with the roasted coffee beans, is introduced into the aqueous solvent and a method wherein the raw material roasted coffee beans are contacted with the aqueous solvent which is being circulated through an adsorption column packed with the porous adsorbent. The method of contacting the aqueous solvent with the porous adsorbent is preferably a method wherein the aqueous solvent is circulated both through an adsorption column packed with the porous adsorbent and through a column to which the raw material roasted coffee beans were introduced.

The amount of the porous adsorbent is preferably 0.001 to 10 parts relative to 1 part of the raw material roasted coffee beans. From the viewpoint of efficiently removing hydroxyhydroquinone from the aqueous solvent while allowing flavors to remain therein, the amount of the porous adsorbent is preferably 0.01 to 1 part, more preferably 0.1 to 0.5 part. The amount of the porous adsorbent is usually 0.01 to 10 parts relative to 1 part of soluble solids in the aqueous solvent. From the viewpoint of efficiently removing hydroxyhydroquinone from the aqueous solvent while allowing flavors to remain therein, the amount of the porous adsorbent is preferably 0.01 to 1 part, more preferably 0.1 to 0.6 part.

Contacting of the aqueous solvent with the porous adsorbent can be conducted for 1 second to 100 hours. In the stirring batch treatment method, the contact time is preferably 1 to 50 hours. In the column passage method, the retention time of the aqueous solvent in the column is 1 minute to 10 hours, preferably 5 minutes to 1 hour.

As types of the porous adsorbent, it is possible to employ carbonaceous adsorbents, silica-alumina adsorbents, polymer adsorbents and chitosan resin described in Adsorption Technology Handbook "Purosesu•Zairyo•Sekkei (Process, Material and Design)" published on Jan. 11, 1999 by NTS Inc. and supervised by You Takeuchi. From the viewpoint of allowing the coffee flavor to in the roasted coffee beans, carbonaceous adsorbents are preferable.

The carbonaceous adsorbents that can be used herein include powdered activated carbon, granular activated carbon, super activated carbon, activated carbon activated with KOH, phenolic activated carbon, activated carbon fibers, and carbon nanotubes. From the viewpoint of selective adsorption of hydroxyhydroquinone, powdered activated carbon, granular activated carbon, and activated carbon fibers are preferable.

Materials from which powdered activated carbon and granular activated carbon are derived include sawdust, wood, coal, and palm shell, and palm shell-derived palm shell activated carbon is preferred. Palm shell activated carbon, activated with a gas such as steam, is more preferred. As commercial products of such steam-activated activated carbon, SHIRASAGI WH2c (Japan EnviroChemicals, Ltd.), TAIKO CW (Futamura Chemical Industries Co., Ltd.), KURARAY COAL GL (Kuraray Chemical Co., Ltd.) and the like can be used.

The particle size of the porous adsorbent is not particularly limited, but from the viewpoint of improving the rate of adsorption of hydroxyhydroquinone and of improving the ability of the porous adsorbent to be separated from the aqueous solvent, the average particle size is preferably 10 μm to 2 mm, more preferably 50 μm to 1 mm, even more preferably 50 μm to 0.5 mm and even more preferably 150 μm to 400 μm.

The activated carbon fibers include polyacrylonitrile-based activated carbon fibers such as Fine Guard (manufactured by Toho Rayon Co., Ltd.), pitch-based activated carbon fibers such as Adol (manufactured by Unitika Ltd.), phenol-based activated carbon fibers such as Kuractive (manufactured by Kuraray Co., Ltd.), cellulose-based activated carbon fibers such as K Filter (manufactured by Toyobo Co., Ltd.), other phenol-based activated carbon fibers and cotton-based activated carbon fibers.

The form of the porous adsorbent is not particularly limited, and the porous adsorbent may be not only in a usual powdery or granular form but also in the form of a product containing the adsorbent kneaded in fibers, a product having plural kinds of porous adsorbents molded therein or a product having the porous adsorbent molded with cellulose, non-woven fabrics and a binder.

Use is made preferably of a porous adsorbent wherein the volume of pores having 0.7 nanometer (nm) or less is 10% or more based on the total volume of pores in the porous adsorbent. The porous adsorbent is more preferably one wherein the volume of pores having 0.7 nanometer (nm) or less is 30% or more, even more preferably 50% or more, even more preferably 70% or more, based on the total volume of pores in the porous adsorbent. The porous adsorbent wherein the volume of pores having 0.7 nanometer (nm) or less is less than 10% based on the total volume of pores in the porous adsorbent tends to be poor in selectivity in removal of hydroxyhydroquinone. The radius and volume of pores in the porous adsorbent, when in the range of pore radii of 1 nanometer (nm) or less, are values determined by an MP method, or when in the range of pore radii of greater than 1 nanometer (nm), are values determined by a KJH method. Whether the volume of pores having 0.7 nanometer (nm) or less is 10% based on the total volume of pores in the porous adsorbent can be judged from a pore distribution curve obtained by the MP method and KJH method. The MP method is a pore measurement method described in a document (Colloid and Interface Science, 26, 46 (1968)), and the KJH method is a pore measurement method described in a document (J. Amer. Chem. Soc., 73, 373 (1951)).

The product of the present invention, that is, the refined roasted coffee beans from which hydroxyhydroquinone was removed, can be obtained by separating the aqueous solvent and/or the porous adsorbent from the refined roasted coffee beans.

As the separation method, it is possible to employ a separation method of washing away matters adhering to the surfaces of beans by using water, a water-soluble organic solvent, or water-soluble organic solvent-containing water, a sieve classification method of separating the porous adsorbent through a sieve or the like and a method of removing the porous adsorbent by utilizing difference in specific gravity, or a combination thereof may also be used.

The refined roasted coffee beans thus obtained may be subjected directly as a coffee product to extraction with water such as hot water or espresso extraction to produce a coffee extract, but from the viewpoint of storage, the refined roasted coffee beans are subjected preferably to drying etc. to remove the aqueous solvent from the refined roasted coffee beans. The content of the aqueous solvent in the refined roasted coffee beans after drying is 0.1 to 50%, preferably 1 to 20%, more preferably 1 to 10%. As the drying method, it is possible to employ drying with hot air at 50 to 250° C., tray drying, dying under reduced pressure at 50 to 150° C., or freeze drying.

The refined roasted coffee beans produced in this manner can be used to produce a coffee extract.

The coffee extract of the refined roasted coffee beans may be blended with an extract of raw coffee beans or of raw material roasted coffee beans.

The method of extraction from the refined roasted coffee beans is not limited. For example, there is a method of extraction from the refined roasted coffee beans or a ground product thereof with an extraction solvent for 10 seconds to 120 minutes. The degree of grinding includes very fine grinding (0.250 to 0.500 mm), fine grinding (0.300 to 0.650 mm), medium-fine grinding (0.530 to 1.000 mm), medium grinding (0.650 to 1.500 mm), medium-coarse grinding, coarse grinding (0.850 to 2.100 mm) and very coarse grinding (1.000 to 2.500 mm), or a cut product with an average particle size of about 3 mm, 5 mm or 10 mm can be mentioned. The extraction method includes a boiling system, an espresso system, a siphon system and a dripping system (through a paper, a flannel or the like).

The extraction solvent includes water, alcohol-containing water, milk, and carbonated water. Water is preferable because its extract is excellent in flavor. The pH of the extraction solvent is 4 to 10 and is preferably 5 to 7 from the viewpoint of flavor. The pH of the extraction solvent may be regulated by adding a pH regulating agent such as sodium hydrogen bicarbonate, sodium bicarbonate, L-ascorbic acid, or Na L-ascorbate. The temperature of the extraction solvent is not problematic as long as the extraction solvent is liquid (at ordinary pressure or under pressure), and specifically the temperature of the solvent is preferably −10 to 200° C., more preferably 0 to 100° C., even more preferably 10 to 100° C. and even more preferably 80 to 100° C., from the viewpoint of enabling efficient extraction of chlorogenic acids.

The extractor includes a paper drip, a nonwoven fabric drip, a siphon, a flannel drip, an espresso machine, a coffee machine, a percolator, a coffee press, an Ibrik, a water drip, an iron pot capable of boiling and stirring, a paper or nonwoven fabric bag-shaped structure substantially capable of suspension on a coffee cup, a drip extractor having a spray nozzle in an upper part and a structure (a mesh, a punching metal or the like) substantially capable of solid-liquid separation of coffee beans in a lower part, and a column extractor having a structure substantially capable of solid-liquid separation of the refined roasted coffee beans, such as a mesh or a punching metal, in an upper part and in a lower part. The extractor can be provided with an electric heater or a structure capable of heating or cooling such as a jacket through which hot water, stream or cold water can be passed.

The extraction method includes a batch extraction method, a semi-batch extraction method and a continuous extraction method. The extraction time in the batch extraction method or semi-batch extraction method, that is, the contact time of the extraction solvent with, or the retention time of the solvent in, the refined roasted coffee beans is preferably 10 seconds to 120 minutes, more preferably 30 seconds to 30 minutes.

The amount of the extraction solvent is preferably 0.5 to 50 parts relative to 1 part of the refined roasted coffee beans. The amount of the extraction solvent is particularly preferably 0.5 to 10 parts.

To further reduce the content of hydroxyhydroquinone in the obtained coffee extract, the extract may be contacted with the porous adsorbent.

After extraction, the content of refined roasted coffee bean-derived soluble solids in the coffee extract is preferably 0.1% or more, more preferably 0.25 to 50%, even more preferably 0.5 to 30% and even more preferably 0.5 to 20%, from the viewpoint of flavor stability.

The content of refined roasted coffee bean-derived soluble solids in the coffee extract at the time of drinking is preferably 0.1% or more, more preferably 0.25 to 5%, even more preferably 0.5 to 3% and even more preferably 0.5 to 2%, from the viewpoint of excellent flavor.

The coffee extract can be used to produce a coffee composition which can be blended, charged and sterilized in coffee, in coffee beverages, and in beverages packed in PET bottles, cans, cups and paper containers. The coffee composition obtained from the refined roasted coffee beans produced by the process of the present invention can be compounded with sugar components such as granulated sugar, white superior soft sugar, maltose and sucrose and with milk components such as raw milk, cow milk, total powdered milk, powdered skimmed milk, raw cream, concentrated milk, skimmed milk, partially skimmed milk, and condensed milk. As an emulsifier and/or a dispersant, sucrose fatty esters, polysaccharides such as carrageenan, casein proteins, and polyglycerin fatty esters can be used alone or in combination thereof.

The refined roasted coffee beans are used in an amount of 1 g or more, preferably 2.5 g or more, and more preferably 5 g or more, in terms of raw beans per 100 g of the coffee composition.

At the time of drinking, the coffee composition obtained from the coffee extract as the product of the present invention contains chlorogenic acids in an amount of 0.01 to 10% and hydroxyhydroquinone in an amount of less than 0.1% based on the amount of the chlorogenic acids.

The content of chlorogenic acids is preferably 0.01 to 5%, more preferably 0.1 to 5%. The content of hydroxyhydroquinone based on the amount of chlorogenic acids is preferably 0.0001 to 0.1%, more preferably 0.0001 to 0.06% and even more preferably 0.0001 to 0.03%.

The coffee extract can be dried to form soluble coffee. The drying method can be exemplified by spray drying and freeze drying, but is not particularly limited. The form of soluble coffee includes powder, granules and tablets.

The soluble coffee obtained from the coffee extract as the product of the present invention contains chlorogenic acids in an amount of 0.5 to 30% and hydroxyhydroquinone in an amount of less than 0.1% based on the amount of the chlorogenic acids.

The content of chlorogenic acids is preferably 0.5 to 17%, more preferably 0.5 to 10%. The content of hydroxyhydroquinone based on the amount of the chlorogenic acids is preferably 0.0001 to 0.1%, more preferably 0.0001 to 0.06% and even more preferably 0.0001 to 0.03%.

Hereinafter, the invention (II) will be described in detail.

The Hunter L value as determined with a colorimeter from the degree of roasting of the refined roasted coffee beans produced by the present invention is preferably 10 to 30. When the degree of roasting is in this range, the coffee beans are made excellent in balance between coffee fragrance and sweetness. From the viewpoint of obtaining beans containing a large amount of chlorogenic acids, the Hunter L value is preferably 10 to 25, more preferably 15 to 25 and even more preferably 20 to 25. When the Hunter L value is 10 or more, the coffee beans have a less burning smell, and when the L value is 30 or less, the coffee beans become excellent in coffee flavor. Two or more kinds of refined roasted coffee beans different in the degree of roasting with Hunter L values of 10 to 60 may be mixed and regulated to have a Hunter L value of 10 to 30.

A method of measuring the degree of roasting is carried out as follows. 50% of roasted coffee beans are ground to a grain size of 0.8 to 1.2 mm such that the amount of beans having a grain size of 0.5 mm or less and the amount of beans having a grain size of 2 mm or more are regulated to be 5% or less respectively, and chaff is removed as necessary. The ground beans are introduced into a cell, sufficiently tapped and then measured with a spectroscopic colorimeter. As the spectroscopic colorimeter, SE-2000 manufactured by Nippon Denshoku Industries Co., Ltd. or the like can be used.

The amount of chlorogenic acids in the refined roasted coffee beans is preferably 0.1 to 6% by mass (hereinafter referred to merely as %). The amount of chlorogenic acids is preferably 0.1 to 5%, more preferably 0.1 to 4.5%, even more preferably 0.2 to 4.2%, even more preferably 0.2 to 4% and even more preferably 2 to 4%.

The content of hydroxyhydroquinone in the refined roasted coffee beans is not higher than 30 mg/kg. The content of hydroxyhydroquinone is preferably not higher than 20 mg/kg, more preferably not higher than 10 mg/kg, even more preferably not higher than 5 mg/kg and even more preferably not higher than 1 mg/kg.

The content of hydroxyhydroquinone relative to the amount of chlorogenic acids in the refined roasted coffee beans is preferably lower than 0.1%, more preferably 0.0001 to 0.06%, even more preferably 0.0001 to 0.03%. When the content of hydroxyhydroquinone relative to the amount of chlorogenic acids in the refined roasted coffee beans is lower than 0.1%, the generation of hydrogen peroxide in the body is inhibited and simultaneously the physiological effects of chlorogenic acids reduced by hydroxyhydroquinone, for example, hypertension-alleviating effects, can be easily exhibited.

The content of chlorogenic acids relative to the content of soluble solids in the refined roasted coffee beans is preferably 0.5 to 30%. The content of chlorogenic acids relative to the content of soluble solids in the roasted coffee beans is preferably 0.5 to 25%, more preferably 0.5 to 17%, even more preferably 1 to 15% and even more preferably 1 to 13%. When the content of chlorogenic acids relative to the content of soluble solids in the refined roasted coffee beans, the physiological effects of chlorogenic acids in coffee beverages can be easily exhibited and simultaneously an excellent coffee flavor can be easily obtained.

The chlorogenic acids are the same as described above in the invention (I).

Each composition in the refined roasted coffee beans in the present invention is determined from a liquid composition extracted from the refined roasted coffee beans. The extraction conditions used are those described in the Examples.

The content of chlorogenic acids and the content of hydroxyhydroquinone can be measured in the same manner as described above in the invention (I).

The amounts of chlorogenic acids, hydroxy quinone, and soluble solids as determined by the measurement described above are calculated as the contents in the coffee beans by the equations (1), (2) and (3) above respectively.

Now, the process for producing the refined roasted coffee beans from which hydroxyhydroquinone was removed according to the present invention is described. First, coffee beans are roasted to yield raw material roasted coffee beans.

The method of roasting coffee beans can be carried out in the same manner as described above in the invention (I). The raw material roasted coffee beans are also the same as described above in the invention (I).

As the degrees of roasting of raw material roasted coffee beans, there are light, cinnamon, medium, high, city, full-city, French, and Italian, among which light, cinnamon, medium, high, and city are preferable because the coffee beans with these degrees contain a large amount of chlorogenic acids and provide easily drunk beverages.

The raw material roasted coffee beans are contacted with water containing an extract derived from roasted coffee beans having a Hunter L value of 40 or more or water containing an extract derived from raw coffee beans (hereinafter referred to as coffee bean-derived extract-containing water). Use of water containing an extract derived from raw coffee beans is preferable in selectively removing hydroxyhydroquinone without eluting chlorogenic acids from the roasted coffee beans, because this treatment water is free of hydroxyhydroquinone and rich in chlorogenic acids.

On the other hand, use of water containing an extract derived from roasted coffee beans having a Hunter L value of 40 or more is advantageous in that fragrant flavors of coffee can be effectively maintained. Further, use of water containing an extract derived from roasted coffee beans having a Hunter L value of 40 or more is advantageous from the viewpoint of ease in the process and of conferring coffee flavors, because previous removal of hydroxyhydroquinone from roasted coffee beans having a Hunter L value of 40 or more is not necessary due to an extremely low content of hydroxyhydroquinone in the roasted coffee beans. The L value of low roasted coffee beans is preferably 40 to 55, more preferably 42 to 52.

To efficiently remove hydroxyhydroquinone from roasted beans, the content of hydroxyhydroquinone in coffee bean-derived extract-containing water is preferably not higher than 6 mg/kg, more preferably not higher than 3 mg/kg, even more preferably not higher than 1 mg/kg, even more preferably not higher than 0.5 mg/kg and even more preferably not higher than 0.1 mg/kg.

The ratio by mass of hydroxyhydroquinone to chlorogenic acids in the aqueous solvent is preferably 1% or less, more preferably 0.0001 to 0.5%, even more preferably 0.0001 to 0.1% and even more preferably 0.0001 to 0.06%.

The concentration of chlorogenic acids in the coffee bean-derived extract-containing water is preferably 0.01 to 5%, more preferably 0.05 to 3%, even more preferably 0.1 to 2%, from the viewpoint of effectively preventing the elution of chlorogenic acids from the roasted beans and simultaneously eluting hydroxyhydroquinone effectively therefrom.

The concentration of water-soluble solids in the coffee bean-derived extract-containing water, when expressed in Brix, is preferably 2 to 15. When the concentration of water-soluble solids is in this range, the process of removing hydroxyhydroquinone can smoothly proceed. The concentration is more preferably 2 to 13, more preferably 3 to 12.

The coffee bean-derived extract-containing water preferably use water only as the solvent for effectively maintaining flavor components in the refined roasted coffee beans, but may if necessary use a hydrophilic organic solvent or an aqueous solution containing a small amount of a hydrophilic organic matter. The water-soluble organic solvent includes ethanol, methyl ethyl ketone, methanol, and acetone. From the viewpoint of efficiently removing hydroxyhydroquinone, ethanol is preferable. The water-soluble organic matter is preferably an organic matter which is dissolved in an amount of 25 g or more in 100 g of water at 20° C. Specifically, the water-soluble organic matter can be exemplified by sugars, polyhydric alcohols, and water-soluble polymers. These water-soluble organic matters maybe used alone or as a mixture of two or more thereof. The sugars include glucose, galactose, fructose, mannose, mannitol, saccharose, maltose, lactose, and oligosaccharides. The polyhydric alcohols include glycerin, sorbitol, ethylene glycol, polyethylene glycol, propylene glycol, and polypropylene glycol. The water-soluble polymers include sodium polyacrylate, polyethyleneimine, polyvinyl alcohol, polyethylene oxide, and polyvinyl pyrrolidone. Preferable among these water-soluble organic matters are polyhydric alcohols, among which glycerin or sorbitol is particularly preferable.

The water-soluble organic solvent and/or the water-soluble organic matter can be used at a concentration of 0.01 to 5% in water.

The method of contacting raw material roasted coffee beans with coffee bean-derived extract-containing water includes a stirring batch treatment method wherein the raw material roasted coffee beans are treated by mixing them with coffee bean-derived extract-containing water and a column treatment method wherein the raw material roasted coffee beans are packed in a column and coffee bean-derived extract-containing water is passed through the column. From the viewpoint of extraction efficiency, the column treatment method is preferable. In the stirring batch treatment method, the raw material roasted coffee beans are stirred preferably in a floating state in an aqueous solvent. In the column treatment method, the column may have a structure in which the raw material roasted coffee beans are substantially not leaked into an aqueous solvent, and can be exemplified by, for example, a column having a mesh structure in a liquid inlet and outlet respectively.

The raw material roasted coffee beans used herein may be either a ground or non-ground product. From the viewpoint of allowing flavors to remain in the roasted coffee beans, non-ground roasted coffee beans are preferably used. When the ground product is used, the degree of grinding includes very fine grinding (0.250 to 0.500 mm), fine grinding (0.300 to 0.650 mm), medium-fine grinding (0.530 to 1.000 mm), medium grinding (0.650 to 1.500 mm), medium-coarse grinding, coarse grinding (0.850 to 2.100 mm) and very coarse grinding (1.000 to 2.500 mm), or a cut product with an average particle size of about 3 mm, 5 mm or 10 mm can be mentioned. Alternatively, a non-ground product may be subjected to the treatment of the present invention and then ground.

The mass of the treatment solution used per 1 part by mass of raw material roasted coffee beans is preferably 0.1 to 1000 parts by mass (hereinafter referred to merely as parts). From the viewpoint of efficiently removing hydroxyhydroquinone from the roasted beans, the treatment solution is more preferably 1 to 100 parts, even more preferably 1 to 50 parts and even more preferably 1 to 20 parts.

The temperature of the coffee bean-derived extract-containing water may such that the water is in a liquid state. From the viewpoint of allowing flavors and chlorogenic acids to remain in larger amounts in the roasted beans while selectively removing hydroxyhydroquinone therefrom, the temperature of the water is preferably 5 to 100° C., more preferably 5 to 60° C., even more preferably 5 to 30° C.

Contacting of the coffee bean-derived extract-containing water with raw material roasted coffee beans can be conducted for 1 second to 100 hours. In the stirring batch treatment method, the contact time is preferably 1 to 50 hours. In the column passage method, the retention time of the water in the column is 1 minute to 10 hours, preferably 5 minutes to 1 hour.

The coffee bean-derived extract-containing water used in treatment of the raw material roasted coffee beans can be used repeatedly, but the water is reused preferably after hydroxyhydroquinone that has increased in each treatment is reduced. Before treatment, hydroxyhydroquinone in the coffee bean-derived extract-containing water may be previously reduced. The method of reducing hydroxyhydroquinone is preferably a method of contacting, with a porous adsorbent, the coffee bean-derived extract-containing water that was used in treatment.

Contacting of the raw material roasted coffee beans with the aqueous solvent preferably includes a step of contacting the aqueous solvent with a porous adsorbent. By contacting the aqueous solvent with a porous adsorbent, hydroxyhydroquinone which has transferred from raw material roasted coffee beans to the aqueous solvent can be removed by absorption into the porous adsorbent, and the hydroxyhydroquinone can thereby be efficiently removed from the raw material roasted coffee beans.

The relationship between contacting of the raw material roasted coffee beans with the coffee bean-derived extract-containing water and contacting of the aqueous solvent with the porous adsorbent includes, for example, the following relationships: that is, (i) a step of previously contacting the coffee bean-derived extract-containing water with the porous adsorbent, and then contacting the coffee bean-derived extract-containing water which has been contacted with the porous adsorbent, with the raw material roasted coffee beans; (ii) a step of allowing the raw material roasted coffee beans, the coffee bean-derived extract-containing water and the porous adsorbent to be simultaneously coexistent, thereby adsorbing, onto the porous adsorbent, hydroxyhydroquinone extracted from the raw material roasted coffee beans; and (iii) a step of contacting the raw material roasted coffee beans with the coffee bean-derived extract-containing water, then contacting the coffee bean-derived extract-containing water with the porous adsorbent, and again contacting, with the raw material roasted coffee beans, the coffee bean-derived extract-containing water obtained by contacting with the porous adsorbent.

In any of the methods, contacting of the coffee bean-derived extract-containing water with the porous adsorbent may be carried out by a method of dispersing the porous adsorbent in the coffee bean-derived extract-containing water and then separating the porous adsorbent (stirring batch method) or by a method of passing the coffee bean-derived extract-containing water through a column or the like charged with the porous adsorbent (column passage method). The method (ii) may be carried out by a method wherein a tank in which the coffee bean-derived extract-containing water is contacted with the porous adsorbent, and a tank or column in which the coffee bean-derived extract-containing water is contacted with the porous adsorbent, are separately prepared and then connected to each other, thereby circulating the coffee bean-derived extract-containing water.

The method of contacting the coffee bean-derived extract-containing water with the porous adsorbent includes a stirring batch method wherein the porous adsorbent, together with the roasted coffee beans, is introduced into the coffee bean-derived extract-containing water and a method wherein the raw material roasted coffee beans are contacted with the coffee bean-derived extract-containing water which is being circulated through an adsorption column packed with the porous adsorbent. The method of contacting the coffee bean-derived extract-containing water with the porous adsorbent is preferably a method wherein the coffee bean-derived extract-containing water is circulated both through an adsorption column packed with the porous adsorbent and through a column to which the raw material roasted coffee beans were introduced.

As types of the porous adsorbent, it is possible to employ carbonaceous adsorbents, silica-alumina adsorbents, polymer adsorbents and chitosan resin described in Adsorption Technology Handbook "Purosesu•Zairyo•Sekkei (Process, Material and Design)" published on Jan. 11, 1999 by NTS Inc. and supervised by You Takeuchi. From the viewpoint of allowing the coffee flavor to in the roasted coffee beans, carbonaceous adsorbents are preferable.

The carbonaceous adsorbents that can be used herein include powdered activated carbon, granular activated carbon, super activated carbon, activated carbon activated with KOH, phenolic activated carbon, activated carbon fibers, and carbon nanotubes. From the viewpoint of selective adsorption of hydroxyhydroquinone, powdered activated carbon, granular activated carbon, and activated carbon fibers are preferable.

Materials from which powdered activated carbon and granular activated carbon are derived include sawdust, wood, coal, and palm shell, and palm shell-derived palm shell activated carbon is preferred. Palm shell activated carbon, activated with a gas such as steam, is more preferred. As commercial products of such steam-activated activated carbon, SHIRASAGI WH2c (Japan EnviroChemicals, Ltd.), TAIKO CW (Futamura Chemical Industries Co., Ltd.), KURARAY COAL GL (Kuraray Chemical Co., Ltd.) and the like can be used.

The particle size of the porous adsorbent is not particularly limited, but from the viewpoint of improving the rate of adsorption of hydroxyhydroquinone and of improving the ability of the porous adsorbent to be separated from the aqueous solvent, the average particle size is preferably 10 µm or more to 2 mm or less, more preferably 50 µm or more to 1 mm or less, even more preferably 50 µm or more to 0.5 mm or less and even more preferably 150 µm or more to 400 µm or less.

The activated carbon fibers include polyacrylonitrile-based activated carbon fibers such as Fine Guard (manufactured by Toho Rayon Co., Ltd.), pitch-based activated carbon fibers such as Adol (manufactured by Unitika Ltd.), phenol-based activated carbon fibers such as Kuractive (manufactured by Kuraray Co., Ltd.), cellulose-based activated carbon fibers such as K Filter (manufactured by Toyobo Co., Ltd.), other phenol-based activated carbon fibers and cotton-based activated carbon fibers.

The form of the porous adsorbent is not particularly limited, and the porous adsorbent may be not only in a usual powdery or granular form but also in the form of a product containing the adsorbent kneaded in fibers, a product having plural kinds of porous adsorbents molded therein or a product having the porous adsorbent molded with cellulose, non-woven fabrics and a binder.

The porous adsorbent wherein the volume of pores having 0.7 nanometer (nm) or less is 10% or more based on the total volume of pores in the porous adsorbent can be preferably used in selectively removing hydroxyhydroquinone from the treatment solution after treatment as well as in preventing reduction in the concentration of chlorogenic acids. The porous adsorbent is more preferably one wherein the volume of pores having 0.7 nanometer (nm) or less is 30% or more, particularly 50% or more, especially 70% or more, based on the total volume of pores in the porous adsorbent. The porous adsorbent wherein the volume of pores having 0.7 nanometer (nm) or less is less than 10% based on the total volume of pores in the porous adsorbent tends to be poor in selectivity in removal of hydroxyhydroquinone. The radius and volume of pores in the porous adsorbent, when in the range of pore radii of 1 nanometer (nm) or less, are values determined by an MP method, or when in the range of pore radii of greater than 1 nanometer (nm), are values determined by a KJH method. Whether the volume of pores having 0.7 nanometer (nm) or less is 10% based on the total volume of pores in the porous adsorbent can be judged from a pore distribution curve obtained by the MP method and KJH method. The MP method is a pore measurement method described in a document (Colloid and Interface Science, 26, 46 (1968)), and the KJH method is a pore measurement method described in a document (J. Amer. Chem. Soc., 73, 373 (1951)).

After have been separated from the coffee bean-derived extract-containing water and the porous adsorbent, the product of the present invention that is the refined roasted coffee beans, from which hydroxyhydroquinone has been separated, may be subjected directly as a coffee product to extraction with water such as hot water or espresso extraction to produce a coffee extract. From the viewpoint of storage, the refined roasted coffee beans are subjected to drying etc. to remove the coffee bean-derived extract-containing water from the refined roasted coffee beans. The content of the coffee bean-derived extract-containing water in the refined roasted coffee beans after drying is 0.1 to 50%, preferably 1 to 20%, more preferably 1 to 10%. As the drying method, it is possible to employ drying with hot air at 50 to 250° C., dying under reduced pressure at 50 to 150° C., or freeze drying.

The refined roasted coffee beans produced in this manner can be used to produce a coffee extract which can be blended, charged and sterilized in coffee, in coffee beverages, and in beverages packed in PET bottles, cans, cups and paper containers. Alternatively, the coffee extract can be dried to form soluble coffee.

The coffee extract of the refined roasted coffee beans may be blended with an extract of raw coffee beans.

The method of extraction from the refined roasted coffee beans is not limited. For example, there is a method of extraction from the refined roasted coffee beans or a ground product thereof with an extraction solvent for 10 seconds to 120 minutes.

The extraction method includes a batch extraction method, a semi-batch extraction method and a continuous extraction method. The extraction time in the batch extraction method or semi-batch extraction method is preferably 10 seconds to 120 minutes, more preferably 30 seconds to 30 minutes, from the viewpoint of flavor.

The amount of the extraction solvent is preferably 0.5 to 50 parts relative to 1 part of the refined roasted coffee beans. The amount of the extraction solvent is particularly preferably 0.5 to 10 parts.

To further reduce the content of hydroxyhydroquinone in the obtained coffee extract, the extract may be contacted with the porous adsorbent.

At the time of drinking, the coffee composition obtained from the coffee extract from the refined roasted coffee beans as the product of the present invention contains chlorogenic acids in an amount of 0.01 to 10% and hydroxyhydroquinone reduced to less than 0.1% based on the amount of the chlorogenic acids, and thus the desired physiological effects can be expected.

EXAMPLES

The present invention is described in detail with reference to the Examples. The Examples are merely illustrative of the present invention and are not intended to limit the present invention.

Method of evaluating a Composition of Coffee Beans 40 g coffee beans ground with a mill to the level of fine milling (grain size range: 0.300 to 0.650 mm) were extracted with 400 g water at 90° C., then cooled and analyzed for the composition. For extraction, a coffee maker NC-471 manufactured by National was used. Thereafter, chlorogenic acids, hydroxyhydroquinone, and soluble solids in the obtained extract were quantified by the following analysis method.

Evaluation of the Flavor and Foreign taste of Coffee extract.

A coffee extract having a soluble solid content of 1% was evaluated sensorily by a panel of 5 specialists.

Evaluation of Flavor
1: There is no coffee flavor.
2: There is a slight coffee flavor.
3: There is a coffee flavor.
4: There is an excellent coffee flavor.

Evaluation of Foreign Taste
1: There is a foreign taste.
2: There is a foreign taste to some extent.
3: There is a slight foreign taste.
4: There is no foreign taste.

Method of analyzing Chlorogenic acids: analysis conditions

HPLC was used as analysis equipment. Model numbers of component units of the equipment are as follows. UV-VIS detector: "L-2420" (Hitachi High-Technologies Corporation), column oven: "L-2300" (Hitachi High-Technologies Corporation), pump: "L-2130" (Hitachi High-Technologies Corporation), autosampler: "L-2200" (Hitachi High-Technologies Corporation), column: "Cadenza CD-C18" (inner diameter 4.6 mm×length 150 mm, particle size: 3 μm) (Intact Corp.).

Analysis conditions are as follows: Sample injection volume: 10 μL, flow rate: 1.0 mL/min, wavelength setting for UV-VIS detector: 325 nm, temperature setting for column oven: 35° C., eluent A: 0.05 M acetic acid, 0.1 mM 1-hydroxyethane-1,1-diphosphonic acid, 10 mM sodium acetate, 5 (V/V) acetonitrile solution, eluent B: acetonitrile.

The flow rate of the mobile phase is 1.0 mL/min.

| Concentration gradient conditions: | | |
| --- | --- | --- |
| Time | Eluent A | Eluent B |
| 0.0 min | 100% | 0% |
| 10.0 min | 100% | 0% |
| 15.0 min | 95% | 5% |
| 20.0 min | 95% | 5% |
| 22.0 min | 92% | 8% |
| 50.0 min | 92% | 8% |
| 52.0 min | 10% | 90% |
| 60.0 min | 10% | 90% |
| 60.1 min | 100% | 0% |
| 70.0 min | 100% | 0% |

In HPLC, 1 g of a sample was accurately weighed, then adjusted in total volume to 10 mL with Eluent A, and filtered through a membrane filter (GL CHROMATODISK 25A, pore size: 0.45 μm, GL Science, Inc.), and the filtrate was subjected to analysis.

Retention Times of Chlorogenic Acids (Unit: Min)
($A^1$) Monocaffeoylquinic acid: 3 kinds at 5.3, 8.8 and 11.6 in total, ($A^2$) feruloylquinic acid: 3 kinds at 13.0, 19.9 and 21.0 in total, and ($A^3$) dicaffeoylquinic acid: 3 kinds at 36.6, 37.4 and 44.2 in total. From the area values of the 9 kinds of chlorogenic acids as determined above, 5-caffeoylquinic acid was chosen as a standard substance, and its mass % was determined.

Analytical Method of Hydroxyhydroquinone by HPLC-Electrochemical Detector

As an analyzer, an HPLC-electrochemical detector (the coulometric type) "COULARRAY SYSTEM" (model 5600 A, manufactured by US ESA Ltd.) was used. The followings are the names and model numbers of component units in the analyzer.

Analytical cell: "MODEL 5010", coularray organizer, coularray-electronics module software: "MODEL 5600A", solvent feeder module: "MODEL 582", gradient mixer, autosampler: "MODEL 542", pulse damper, degasser: "Degasys Ultimate DU3003", column oven "505". Column: "CAPCELL PAK C18 AQ", 4.6 mm inner diameter×250 mm length, particle size: 5 m (Shiseido Co., Ltd.).

Analysis conditions are as follows.

Sample injection volume: 10 μL, flow rate: 1.0 mL/min, voltage applied to electrochemical detector: 0 mV, preset column-oven temperature: 40° C., Eluent C: 5 (V/V) % methanol solution containing 0.1 (W/V) % phosphoric acid and 0.1 mM 1-hydroxyethane-1,1-diphosphonic acid, Eluent D: 50 (V/V) % methanol solution containing 0.1 (W/V) % phosphoric acid and 0.1 mM 1-hydroxyethane-1,1-diphosphonic acid.

For the preparation of Eluent C and Eluent D, distilled water for high-performance liquid chromatography (Kanto Chemical Co., Ltd.), methanol for high-performance liquid chromatography (Kanto Chemical Co., Ltd.), phosphoric acid (guaranteed reagent, Wako Pure Chemical Industries, Ltd.) and 1-hydroxyethane-1,1-diphosphonic acid (60% aqueous solution, Tokyo Kasei Kogyo Co., Ltd.) were used.

| Concentration gradient conditions | | |
| --- | --- | --- |
| Time | Eluent C | Eluent D |
| 0.0 min | 100% | 0% |
| 10.0 min | 100% | 0% |
| 10.1 min | 0% | 100% |
| 20.0 min | 0% | 100% |
| 20.1 min | 100% | 0% |
| 50.0 min | 100% | 0% |

After 5 g of a sample was accurately weighed and adjusted in total volume to 10 mL with 5 (V/V) % methanol solution containing 0.5 (W/V) % phosphoric acid and 0.5 mM 1-hydroxyethane-1,1-diphosphonic acid. The solution was centrifuged to give a supernatant as an analysis sample. This supernatant was passed through BOND ELUTE SCX (weight of packed solid phase: 500 mg, reservoir capacity: 3 mL, GL Science, Inc.), about 0.5 mL of an initial eluate was removed, and a next eluate was obtained. This eluate was subjected to filtration through a membrane filter (GL CHROMATODISK 25A, pore size: 0.45 μm, GL Science, Inc.), and the filtrate was immediately subjected to analysis.

In analysis by the HPLC-electrochemical detector under the conditions, the retention time of hydroxyhydroquinone was 6.38 minutes. From the area values of peaks obtained, their mass percentages were determined by using hydroxyhydroquinone (Wako Pure Chemical Industries, Ltd.) a standard substance.

Hereinafter, the Examples of the invention (I) are described.

Production Example I-1

Production of Treatment Solution (I-1)

Deionized water was directly used.

Production Example I-2

Production of Treatment Solution (I-2)

50% aqueous ethanol was used.

Production Example I-3

Production of Treatment Solution (I-3)

1 part of roasted coffee beans (Brazil Santos No. 2) having a Hunter L value of 22 was extracted with 6 parts of hot water at 98° C. to give an extract. The extract was cooled to 24° C., followed by adding, to the extract, granular activated carbon WH2LCSS (manufactured by Japan EnviroChemicals Ltd.; grain size range: 42 to 80 meshes with JIS standard sieve) in an amount of 0.5 part based on 1 part of soluble solids in the extract, whereby Treatment Solution (I-3) containing chlorogenic acids at a concentration of 0.16%, containing hydroxyhydroquinone in an amount of 0.0025% based on the chlorogenic acids, and having a soluble solid content of 2.0% was obtained.

Production Example I-5

Production of Treatment Solution (I-5)

Purified water was added to an extract with a soluble solid content of 20.0% (manufactured by Takasago Coffee Co., Ltd.) obtained from roasted beans (Brazil Santos No. 2) having a (Hunter) L value of 16.5, whereby Treatment Solution (I-5) containing chlorogenic acids at a concentration of 0.18%, containing hydroxyhydroquinone in an amount of 4.6% based on the chlorogenic acids, and having a soluble solid content of 18.3% was obtained.

Production Example I-6

Production of Treatment Solution (I-6)

An extract with a soluble solid content of 22.4% (manufactured by Takasago Coffee Co., Ltd.; the concentration of chlorogenic acids: 4.5%, and the amount of hydroxyhydroquinone: 0.070% based on the chlorogenic acids) obtained from roasted beans (Vietnam Robusta) having a (Hunter) L value of 35 was used as Treatment Solution (I-6).

Production Example I-7

Production of Treatment Solution (I-7)

An extract with a soluble solid content of 20.6% (manufactured by Takasago Coffee Co., Ltd.; the concentration of chlorogenic acids: 2.3%, and the amount of hydroxyhydroquinone: 0.35% based on the chlorogenic acids) obtained from roasted beans (Brazil Santos No. 2) having a (Hunter) L value of 28 was used as Treatment Solution (I-7).

The analytical values of Treatment Solutions (I-1) to (I-7) are shown in Table I-1.

TABLE I-1

| Aqueous solvent | Treatment solution(I-1) Water | Treatment solution(I-2) 50% ethanol aqueous solution | Treatment solution(I-3) L22 bean extract water (carbon treatment) | Treatment solution(I-4) 20% ethanol solution of L16.5 bean extract water(carbon treatment) | Treatment solution(I-5) L16.5 extract | Treatment solution(I-6) L35 extract | Treatment solution(I-7) L28 extract |
|---|---|---|---|---|---|---|---|
| Brix | 0 | 0 | 2.0 | 1.9 | 18.3 | 22.4 | 20.6 |
| Chlorogenic acids (mass %) | — | — | 0.16 | 0.036 | 0.18 | 4.5 | 2.3 |
| Hydroxyhydroquinone (mg/kg) | — | — | 0.040 | 0.056 | 83 | 32 | 79 |
| Hydroxyhydroquinone (mass % relative to chlorogenic acids) | — | — | 0.0025 | 0.015 | 4.6 | 0.070 | 0.35 |

Production Example I-4

Production of Treatment Solution (I-4)

Roasted coffee beans (Brazil Santos No. 2) having a Hunter L value of 16.5 were subjection to extraction and activated carbon treatment in the same manner as in Production Example I-3, to give a coffee extract containing chlorogenic acids at a concentration of 0.045%, containing hydroxyhydroquinone in an amount of 0.015% based on the chlorogenic acids, and having a soluble solid content of 2.4%. By adding ethanol to the coffee extract until the ethanol concentration reached 20%, Treatment Solution (I-4) containing chlorogenic acids at a concentration of 0.036%, containing hydroxyhydroquinone in an amount of 0.015% based on the chlorogenic acids, and having a soluble solid content of 1.9% was obtained.

Example I-1

600 g of Treatment Solution (I-1) as an aqueous solvent at 25° C., 100 g of a non-ground product of coffee bean Excelso produced in Columbia, having a Hunter L value of 18, as coffee beans, and 13.5 g of activated carbon (WH2CLSS 42/80, manufactured by Japan EnviroChemicals Ltd.) were introduced into a 2-L beaker and stirred for 24 hours.

After the aqueous solvent and activated carbon were removed, the coffee beans were dried at 80° C. for 24 hours in a vacuum dryer to give refined roasted coffee beans.

Example I-2

Refined roasted coffee beans were obtained in the same manner as in Example I-1 except that Treatment Solution (1-2) at 25° C. was used as the aqueous medium.

Example I-3

200 g of Treatment Solution (I-3) as an aqueous solvent at 25° C., 40 g of a non-ground product of coffee bean No. 4/5 produced in Brazil, having a Hunter L value of 21, as coffee beans, and 2.7 g of activated carbon (WH2CLSS 42/80, manufactured by Japan EnviroChemicals Ltd.) were introduced into a 500-mL beaker and stirred for 24 hours.

After the aqueous solvent and activated carbon were washed away and removed, the coffee beans were dried at 80° C. for 9 hours in a vacuum dryer to give refined roasted coffee beans.

Example I-4

Refined roasted coffee beans were obtained in the same manner as in Example I-3 except that activated carbon was not used and the coffee beans were dried at 81° C. for 1 hour in a fluidized-bed dryer (TG200 manufactured by Retsch Co., Ltd.).

Example I-5

Refined roasted coffee beans were obtained in the same manner as in Example I-3 except that Treatment Solution (I-4) was used as the aqueous solvent, and WH2CSS 42/80 (manufactured by Japan EnviroChemicals Ltd.) was used as activated carbon.

Example I-6

Refined roasted coffee beans were obtained in the same manner as in Example I-5 except that 320 g of Treatment Solution (I-5) was used as the aqueous solvent and 17.7 g of activated carbon was used.

Example I-7

Refined roasted coffee beans were obtained in the same manner as in Example I-5 except that 3.35 mm product prepared by coarsely grinding coffee beans was used, Treatment Solution (I-6) was used as the aqueous solvent, 12.7 g of activated carbon was used, and the stirring time was 88 hours.

Example I-8

Refined roasted coffee beans were obtained in the same manner as in Example I-5 except that Treatment Solution (I-6) was used as the aqueous solvent, 12.7 g of activated carbon was used, and the stirring time was 14 hours.

Example I-9

Refined roasted coffee beans were obtained in the same manner as in Example I-5 except that coffee bean No. 2 produced in Brazil, having a Hunter L value of 35, was used as coffee beans, Treatment Solution (I-6) was used as the aqueous solvent, and 12.7 g of activated carbon was used.

Example I-10

Refined roasted coffee beans were obtained in the same manner as in Example I-5 except that coffee bean No. 2 having a Hunter L value of 30 was used as coffee beans, Treatment Solution (I-7) was used as the aqueous solvent, 12.7 g of activated carbon was used, and the stirring time was 7 hours.

Comparative Example I-1

An untreated product of non-ground coffee bean Excelso produced in Columbia, having a Hunter L value of 18, was used.

Comparative Example I-2

A product obtained by drying the roasted beans in Comparative Example I-1 at 80° C. for 24 hours in a vacuum dryer was used.

Comparative Example I-3

An untreated product of non-ground coffee bean No. 4/5 produced in Brazil, having a Hunter L value of 21, was used as coffee beans.

Comparative Example I-4

An untreated product of non-ground coffee bean No. 2 produced in Brazil, having a Hunter L value of 30, was used as coffee beans.

Comparative Example I-5

An untreated product of non-ground coffee bean No. 2 produced in Brazil, having a Hunter L value of 35, was used as coffee beans.

The results are shown in Tables I-2 and I-3.

TABLE I-2

|  | Example I-1 | Example I-2 | Example I-3 | Example I-4 | Example I-5 |
|---|---|---|---|---|---|
| <Raw material roasted coffee beans> | | | | | |
| Degree of roasting of raw material roasted coffee beans | L18 | L18 | L21 | L21 | L21 |
| Weight of raw material roasted coffee beans | 100 g | 100 g | 40 g | 40 g | 40 g |
| <Treatment conditions> | | | | | |
| Treatment solution | Treatment solution(I-1) | Treatment solution(I-2) | Treatment solution(I-3) | Treatment solution(I-3) | Treatment solution(I-4) |
| Amount of treatment solution | 600 g | 600 g | 200 g | 200 g | 200 g |
| Kind of activated carbon | WH2CLSS | WH2CLSS | WH2CLSS | — | WH2CSS |
| Amount of activated carbon | 13.5 g | 13.5 g | 2.7 g | — | 2.7 g |
| Treatment time | 24 hours | 24 hours | 24 hours | 24 hours | 24 hours |
| Drying treatment | vacuum drying | vacuum drying | vacuum drying | Flash drying | vacuum drying |

TABLE I-2-continued

<Refined roasted coffee beans>

| | | | | | |
|---|---|---|---|---|---|
| Hue of refined roasted coffee beans | L16 | L14 | L19 | L20 | L19 |
| Chlorogenic acids(mass % relative to beans) | 0.3 | 0.8 | 0.7 | 0.8 | 0.7 |
| Hydroxyhydroquinone (mg/kg relative to beans) | 0.6 | 2.4 | 0.2 | 1.5 | 0.4 |
| Hydroxyhydroquinone (mass % relative to chlorogqnic acids) | 0.02 | 0.03 | 0.003 | 0.02 | 0.006 |
| Brix | 9 | 15 | 12 | 12 | 15 |
| Flavor | 2 | 3 | 4 | 4 | 3 |

| | Example I-6 | Example I-7 | Example I-8 | Example I-9 | Example I-10 |
|---|---|---|---|---|---|
| <Raw material roasted coffee beans> | | | | | |
| Degree of roasting of raw material roasted coffee beans | L21 | L21 (grinding) | L21 | L35 | L30 |
| Weight of raw material roasted coffee beans | 40 g | 40 g | 40 g | 40 g | 40 g |
| <Treatment conditions> | | | | | |
| Treatment solution | Treatment solution(I-5) | Treatment solution(I-6) | Treatment solution(I-6) | Treatment solution(I-6) | Treatment solution(I-7) |
| Amount of treatment solution | 320 g | 200 g | 200 g | 200 g | 200 g |
| Kind of activated carbon | WH2CSS | WH2CSS | WH2CSS | WH2CSS | WH2CSS |
| Amount of activated carbon | 17.7 g | 12.7 g | 12.7 g | 12.7 g | 12.7 g |
| Treatment time | 24 hours | 88 hours | 14 hours | 24 hours | 7 hours |
| Drying treatment | vacuum drying | vacuum drying | vacuum drying | vacuum drying | vacuum drying |
| <Refined roasted coffee beans> | | | | | |
| Hue of refined roasted coffee beans | L21 | L19 | L25 | L28 | L29 |
| Chlorogenic acids(mass % relative to beans) | 0.8 | 5.1 | 4.3 | 5.0 | 3.3 |
| Hydroxyhydroquinone (mg/kg relative to beans) | 1.5 | 0.6 | 9.7 | 0.5 | 21.7 |
| Hydroxyhydroquinone (mass % relative to chlorogqnic acids) | 0.02 | 0.001 | 0.02 | 0.001 | 0.07 |
| Brix | 24 | 28 | 26 | 25 | 23 |
| Flavor | 4 | 4 | 4 | 3 | 3 |

TABLE I-3

| | Comparative example I-1 | Comparative example I-2 | Comparative example I-3 | Comparative example I-4 | Comparative example I-5 |
|---|---|---|---|---|---|
| <Raw material roasted coffee beans> | | | | | |
| Degree of roasting of raw material roasted coffee beans | L18 | L18 | L21 | L30 | L35 |
| Weight of raw material roasted coffee beans | — | — | — | — | — |
| <Treatment conditions> | | | | | |
| Treatment solution | — | — | — | — | — |
| Amount of treatment solution | — | — | — | — | — |
| Kind of activated carbon | — | — | — | — | — |
| Amount of activated carbon | — | — | — | — | — |
| Treatment time | — | — | — | — | — |
| Drying treatment | — | vacuum drying | — | — | — |
| <Refined roasted coffee beans> | | | | | |
| Hue of refined roasted coffee beans | L18 | L18 | L21 | L30 | L35 |
| Chlorogenic acids(mass % relative to beans) | 0.9 | 0.9 | 1.1 | 2.4 | 2.7 |
| Hydroxyhydroquinone (mg/kg relative to beans) | 198 | 189 | 129 | 53 | 33 |
| Hydroxyhydroquinone (mass % relative to chlorogqnic acids) | 2.2 | 2.1 | 1.2 | 0.2 | 0.1 |
| Brix | 23 | 23 | 20 | 20 | 19 |
| Flavor | 4 | 4 | 4 | 3 | 2 |

Example I-11

Using a cylindrical extractor having a mesh structure in a lower part, 1 part of the refined roasted coffee beans obtained in Example I-3 and 10 parts of hot water at 95° C. were used to prepare a coffee extract. The content of soluble solids derived from the coffee extract was adjusted to 2% with cow milk and an emulsifier, followed by adjusting the pH to 6.6 with sodium bicarbonate, to give a coffee preparation.

The coffee preparation was charged into 190 g drinking can (with a screw cap, manufactured by Toyo Seikan Kaisha, Ltd.) which was then wound and closed, followed by retort sterilization at 128° C. for 11 minutes, to give a coffee composition.

Example I-12

The coffee extract obtained in Example I-11 was freeze-dried to give soluble coffee. The content of chlorogenic acids in soluble solids in the soluble coffee was 5.8%, and the content of hydroxyhydroquinone was 0.003% based on the chlorogenic acids.

The soluble coffee was dissolved in hot water such that the soluble solid content was reduced to 2%, and the resulting coffee composition was analyzed and its flavor was evaluated. The results are shown in Table I-4.

TABLE I-4

|  | Example I-11 | Example I-12 |
|---|---|---|
| Content (%) of coffee extract-derived soluble solids | 2 | 2 |
| Chlorogenic acids (%) | 0.1 | 0.1 |
| Hydroxyhydroquinone (mg/kg) | 0.23 | 0.08 |
| Hydroxyhydroquinone (mass % relative to chlorogqnic acids) | 0.02 | 0.01 |
| Flavor | 4 | 4 |

Example I-13

The coffee extract obtained in Example I-11 was freeze-dried to give soluble coffee. The content of chlorogenic acids in soluble solids in the soluble coffee was 18.5%, and the content of hydroxyhydroquinone was 0.001% based on the chlorogenic acids.

Hereinafter, the examples of the invention (II) will be described.

Production Example II-1

Production of Treatment Solution (II-1)

1 part of roasted coffee beans (Brazil Santos No. 2) having a Hunter L value of 50 were extracted with 6 parts of hot water at 98° C. to give an extract. The extract was cooled to 24° C. followed by adding, to the extract, granular activated carbon WH2CSS (manufactured by Japan EnviroChemicals Ltd.; grain size range #42 to 80) in an amount of 0.5 part based on 1 part of soluble solids in the extract, whereby Treatment Solution (II-1) containing chlorogenic acids at a concentration of 0.76%, containing hydroxyhydroquinone in an amount of 0.01% based on the chlorogenic acids, and having a soluble solid content of 6.0% was obtained.

Production Example II-2

Production of Treatment Solution (II-2)

Treatment Solution (II-1) obtained in Production Example II-1 was diluted 3-fold with deionized water to give Treatment Solution (II-2) containing chlorogenic acids at a concentration of 0.25%, containing hydroxyhydroquinone in an amount of 0.01% based on the chlorogenic acids, and having a soluble solid content of 2.0%.

Production Example II-3

Production of Treatment Solution (II-3)

Treatment Solution (II-3) containing chlorogenic acids at a concentration of 0.86%, containing hydroxyhydroquinone in an amount of less than 0.0006% based on the chlorogenic acids, and having a soluble solid content of 6.0% was obtained in the same manner as in Production Example 1 except that the roasted coffee beans having a Hunter L value of 50 were changed to raw coffee beans.

The analytical values of Treatment Solutions (II-1) to (II-3) are shown in Table II-1.

TABLE II-1

|  | Treatment solution (II-1) L50 bean extract water | Treatment solution (II-2) L50 bean extract water | Treatment solution (II-3) Raw bean extract water |
|---|---|---|---|
| Brix | 6 | 2 | 6 |
| Chlorogenic acids (mass %) | 0.76 | 0.25 | 0.86 |
| Hydroxyhydroquinone (mg/kg) | 0.76 | 0.25 | <0.05 |
| Hydroxyhydroquinone/chlorogenic acids (mass %) | 0.01% | 0.01% | <0.0006% |

Example II-1

1000 g of Treatment Solution (II-1) as an aqueous solvent at 25° C. and 8 g of a non-ground product of coffee bean Excelso produced in Columbia, having a Hunter L value of 22, as coffee beans were introduced into a 2-L beaker and stirred for 24 hours.

Then, the coffee beans were freeze-dried (i.e. solidified by rapid freezing to −40° C. and then subjected to sublimation under vacuum to remove water) to give refined roasted coffee beans.

Example II-2

Refined roasted coffee beans were obtained in the same manner as in Example II-1 except that the amount of the coffee beans used was changed to 30 g and the stirring time was 6 hours.

Example II-3

Refined roasted coffee beans were obtained in the same manner as in Example II-1 except that the amount of the coffee beans used was changed to 10 g and the stirring time was 6 hours.

Example II-4

Refined roasted coffee beans were obtained in the same manner as in Example II-1 except that the amount of the coffee beans used was changed to 10 g and the stirring time was 12 hours.

Example II-5

Refined roasted coffee beans were obtained in the same manner as in Example II-1 except that the amount of the coffee beans used was changed to 10 g, Treatment Solution (II-2) was used in place of Treatment Solution (II-1), and the stirring time was 12 hours.

Example II-6

Refined roasted coffee beans were obtained in the same manner as in Example II-1 except that Treatment Solution (II-3) was used in place of Treatment Solution (II-1).

Comparative Example II-1

100 g of an untreated product of non-ground coffee bean Excelso produced in Columbia, having a Hunter L value of 22, was used.
The results are shown in Table II-2.

TABLE II-2

|  | Example II-1 | Example II-2 | Example II-3 | Example II-4 | Example II-5 | Example II-6 | Comparative example II-1 |
|---|---|---|---|---|---|---|---|
| <Raw material roasted coffee beans> | | | | | | | |
| Degree of roasting of raw material roasted coffee beans | L22 | L22 | L22 | L22 | L22 | L22 | L22 |
| Weight of raw material roasted coffee beans | 8 g | 30 g | 10 g | 10 g | 10 g | 8 g | — |
| <Treatment conditions> | | | | | | | |
| Treatment solution | Treatment solution(II-1) | Treatment solution(II-1) | Treatment solution(II-1) | Treatment solution(II- | Treatment solution(II- | Treatment solution(II- | — |
| Amount of treatment solution | 1000 g | 1000 g | 1000 g | 1000 g | 1000 g | 1000 g | — |
| Amount of activated carbon | — | — | — | — | — | — | — |
| Treatment time | 24 hours | 6 hours | 6 hours | 12 hours | 12 hours | 24 hours | — |
| Drying treatment | Freeze drying | Freeze drying | Freeze drying | Freeze drying | Freeze drying | Freeze drying | — |
| <Refined roasted coffee beans> | | | | | | | |
| Degree of roasting of refined roasted coffee beans | L18 | L20 | L20 | L19 | L18 | L19 | L22 |
| Chlorogenic acids (mass % relative to beans) | 2.1 | 2.3 | 2.1 | 2.2 | 1.4 | 3.5 | 2.2 |
| Hydroxyhydroquinone (mg/kg relative to beans) | 0.5 | 20 | 21 | 5 | <0.05 | 5.8 | 36 |
| Hydroxyhydroquinone/chlorogenic acids (mass %) | 0.002 | 0.084 | 0.098 | 0.023 | <0.0004 | 0.017 | 0.16 |
| Brix | 16 | 24 | 24 | 21 | 15 | 22 | 38 |
| Flavor | 3 | 4 | 4 | 4 | 3 | 3 | 4 |
| Foreign taste | 4 | 4 | 4 | 4 | 4 | 3 | 4 |

The invention claimed is:

1. Refined roasted coffee beans, having a Hunter L value of 10 to 30, a hydroxyhydroquinone content of not higher than 30 mg/kg, and a content of chlorogenic acids of from 0.1 to 6% by mass.

2. The refined roasted coffee beans according to claim 1, wherein the Hunter L value is from 10 to 25.

3. The refined roasted coffee beans according to claim 1, wherein the Hunter L value is from 15 to 25.

4. The refined roasted coffee beans according to claim 1, wherein the content of the hydroxyhydroquinone is from 0.01 to 20 mg/kg.

5. The refined roasted coffee beans according to claim 1, wherein the content of the hydroxyhydroquinone is from 0.01 to 10 mg/kg.

6. The refined roasted coffee beans according to claim 1, wherein a content of chlorogenic acids is from 0.1 to 5% by mass.

7. The refined roasted coffee beans according to claim 1, wherein a content of chlorogenic acids is from 0.2 to 4% by mass.

8. The refined roasted coffee beans according to claim 1, wherein a content of chlorogenic acids relative to a content of soluble solids in the refined roasted coffee beans is from 0.5 to 30% by mass.

9. The refined roasted coffee beans according to claim 1, wherein a content of chlorogenic acids relative to a content of soluble solids in the refined roasted coffee beans is from 0.5 to 17% by mass.

10. The refined roasted coffee beans according to claim 1, wherein a content of chlorogenic acids relative to a content of soluble solids in the refined roasted coffee beans is from 1 to 13% by mass.

11. A method for producing a coffee composition the method comprising:

contacting raw coffee beans and/or roasted coffee beans having a Hunter L value of from 10 to 60 with an aqueous solution, thereby extracting and removing hydroxyhydroquinone from the coffee beans and obtaining a coffee bean-derived extract, contacting the coffee bean-derived extract with roasted coffee beans having a Hunter L value of from 10 to 60, thereby obtaining the refined roasted coffee beans of claim 1 and its extract, and preparing a coffee composition containing the extract of the refined roasted coffee beans, wherein said coffee composition comprises chlorogenic acids in an amount of 0.01 to 10% by mass, and hydroxyhydroquinone in an amount of less than 0.1% by mass based on the chlorogenic acids.

12. A method for producing soluble coffee, the method comprising:

contacting raw coffee beans and/or roasted coffee beans having a Hunter L value of from 10 to 60 with an aqueous solution, thereby extracting and removing hydroxyhydroquinone from the coffee beans and obtaining a coffee bean-derived extract, contacting the coffee bean-derived extract with roasted coffee beans having a Hunter L value of from 10 to 60, thereby obtaining the refined roasted coffee beans of claim 1 and its extract, and drying the extract of the refined roasted coffee beans, thereby preparing soluble coffee, wherein said soluble coffee comprises from 0.5 to 30% by mass of chlorogenic acids based on the amount of soluble solids in the soluble coffee, and less than 0.1% by mass of hydroxyhydroquinone based on the amount of the chlorogenic acids.

13. Refined roasted coffee beans, having a Hunter L value of 10 to 30 and a hydroxyhydroquinone content of not higher than 10 mg/kg, wherein a content of chlorogenic acids is from 0.1 to 5% by mass.

14. Refined roasted coffee beans, having a Hunter L value of 10 to 30 and a hydroxyhydroquinone content of not higher than 10 mg/kg, wherein a content of chlorogenic acids is from 0.2 to 4% by mass.

15. Refined roasted coffee beans, having a Hunter L value of 10 to 30 and a hydroxyhydroquinone content of not higher than 10 mg/kg, wherein a content of chlorogenic acids relative to a content of soluble solids in the refined roasted coffee beans is from 0.5 to 17% by mass.

16. A method for producing soluble coffee, the method comprising:
contacting raw coffee beans and/or roasted coffee beans having a Hunter L value of from 10 to 60 with an aqueous solution, thereby extracting and removing hydroxyhydroquinone from the coffee beans and obtaining a coffee bean-derived extract,
contacting the coffee bean-derived extract with roasted coffee beans having a Hunter L value of from 10 to 60, thereby obtaining the refined roasted coffee beans of claim 1 and its extract, and
drying the extract of the refined roasted coffee beans, thereby preparing soluble coffee,
wherein the refined roasted coffee beans has a Hunter L value of 10 to 30 and a hydroxyhydroquinone content of not higher than 10 mg/kg, and
wherein said soluble coffee comprises from 0.5 to 17% by mass of chlorogenic acids based on the amount of soluble solids in the soluble coffee, and less than 0.1% by mass of hydroxyhydroquinone based on the amount of the chlorogenic acids.

17. The refined roasted coffee beans according to claim 1, wherein a content of water of the refined roasted beans is from 1 to 50%.

18. The refined roasted coffee beans according to claim 13, wherein the content of the hydroxyhydroquinone is from 0.01 to 1 mg/kg.

19. The refined roasted coffee beans according to claim 14, wherein the content of the hydroxyhydroquinone is from 0.01 to 1 mg/kg.

20. The refined roasted coffee beans according to claim 15, wherein the content of the hydroxyhydroquinone is from 0.01 to 1 mg/kg.

21. The soluble coffee according to claim 16, wherein the refined roasted coffee beans contain from 0.01 to 1 mg/kg of the hydroxyhydroquinone.

* * * * *